March 15, 1955 C. C. PECK 2,703,925
TUBE END SIZING APPARATUS AND METHOD
Filed Sept. 26, 1952 3 Sheets-Sheet 1

INVENTOR.
CECIL C. PECK
BY
Oberlin & Limbach
ATTORNEYS.

March 15, 1955  C. C. PECK  2,703,925
TUBE END SIZING APPARATUS AND METHOD
Filed Sept. 26, 1952  3 Sheets-Sheet 2

INVENTOR.
CECIL C. PECK
BY
Oberlin & Limbach
ATTORNEYS.

March 15, 1955     C. C. PECK     2,703,925
TUBE END SIZING APPARATUS AND METHOD
Filed Sept. 26, 1952     3 Sheets-Sheet 3

INVENTOR.
CECIL C. PECK
BY
Oberlin & Limbach
ATTORNEYS.

United States Patent Office 2,703,925
Patented Mar. 15, 1955

2,703,925

TUBE END SIZING APPARATUS AND METHOD

Cecil C. Peck, Euclid, Ohio, assignor to Cecil C. Peck Company, Cleveland, Ohio, a corporation of Ohio Application September 26, 1952, Serial No. 311,682

16 Claims. (Cl. 29—543)

This invention relates, as indicated, to the sizing of tube ends and, more particularly, to a method for sizing the inner and outer diameters of the extreme end portions of automobile propeller shafts and the like and to apparatus for the practice of such method.

Automobile propeller shafts and numerous other shafts of this nature are formed from lengths of ordinary welded tubing having a longitudinal seam, and gears and other elements are welded to the ends of the same, such gears and other elements being provided with studs or protuberances which fit tightly within the tube ends. It is of the greatest importance that these several parts be perfectly axially aligned, and therefore the tube ends receiving such studs or protuberances must be accurately sized. Although the tube ends could be machined to size, this method is generally considered to be unsatisfactory since the scratches produced by the machining operation serve to concentrate stresses in use thereby impairing the functional characteristics of the shaft. It has been found necessary in the past to redraw the ordinary welded tubing to satisfactorily obtain a fairly accurate inner and outer diameter, however, this added operation materially increases the production cost of the shaft.

It is, accordingly, a principal object of my invention to provide a method for accurately and economically sizing the ends of ordinary welded tubing and the like which will permit such tubing to be used substantially "as is" for automobile propeller shafts and other similar uses.

It is a further object of my invention to internally size a tube by forcibly displacing material from the inner surface thereof without, however, expanding the outside diameter of the tube.

A still further object of my invention is to thus internally size a tube while sizing the outside diameter thereof in the same automatic operation.

An additional object of my invention is to size the inside diameter of a tube by establishing a line contact with the inner tube surface and displacing material therefrom through movement of such contact.

Other objects and advantages of the invention will become apparent as the following description proceeds.

To the accomplishment of the foregoing and related ends, the invention, then, comprises the features hereinafter fully described and particularly pointed out in the claims.

The following description and the annexed drawings set forth in detail certain illustrative embodiments of the invention, these being indicative, however, of but a few of the various ways in which the principle of the invention may be employed.

Figure 4:
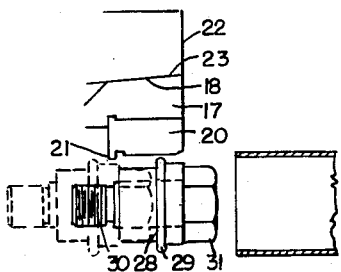
Figure 6:
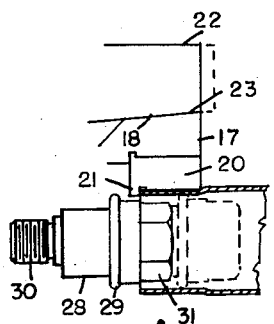
Figure 5:
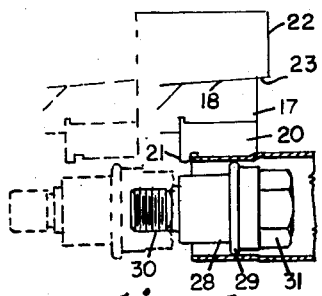

Figs. 4, 5, and 6 are fragmentary diagrammatic illustrations showing the relative position of the die in different stages of a sizing operation.

Referring now to the drawing, my sizing apparatus as there shown comprises a main supporting or body member in the form of a hollow cylinder 1 which is mounted for axial reciprocation upon a supporting frame or structure 2. Suitable hydraulic means, indicated generally at 3, may be provided to control such reciprocatory movement in well-known manner.

Figure 1:
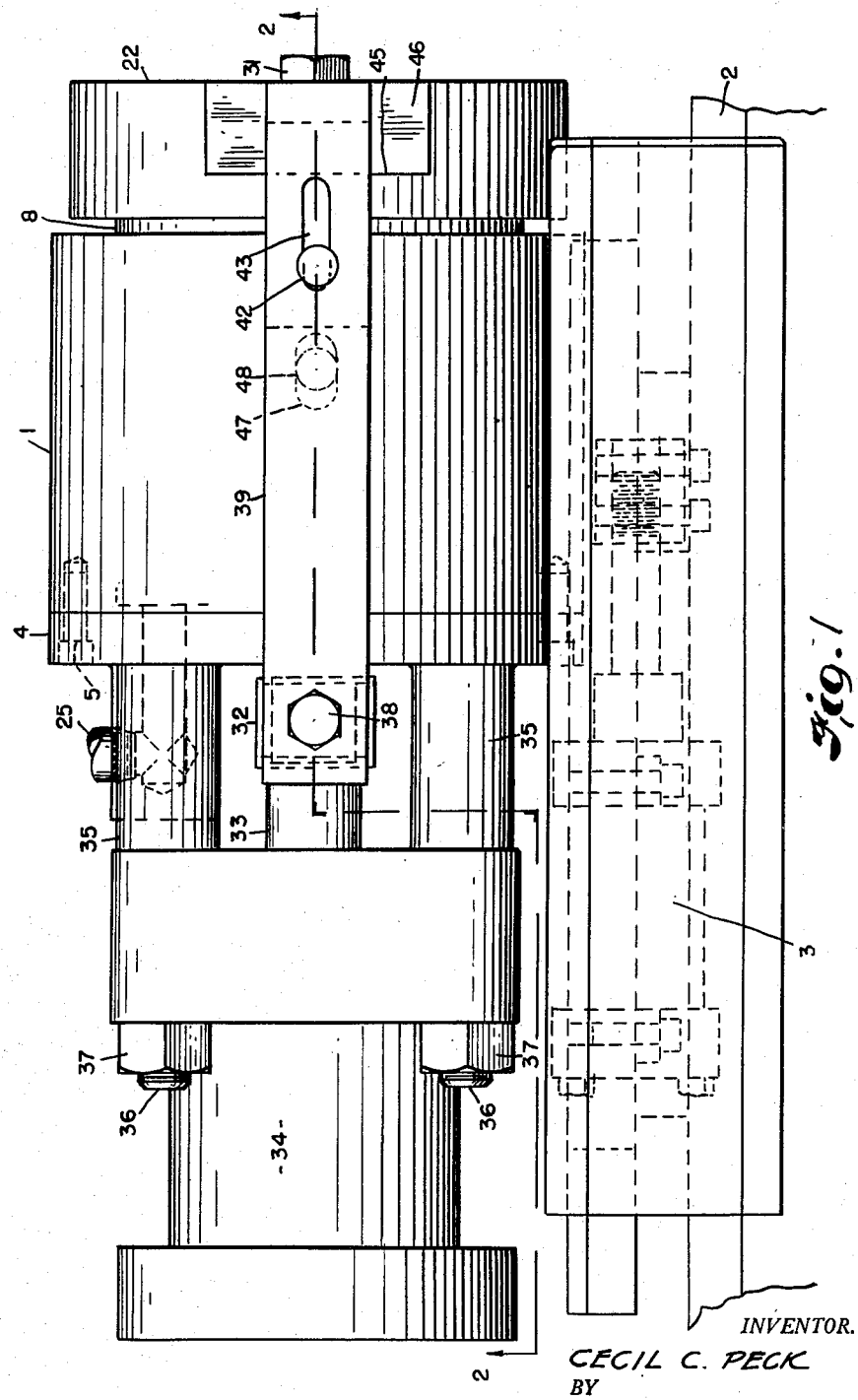
Fig. 1 is a side elevation of my sizing apparatus with the support therefor being broken away.
Figure 2:
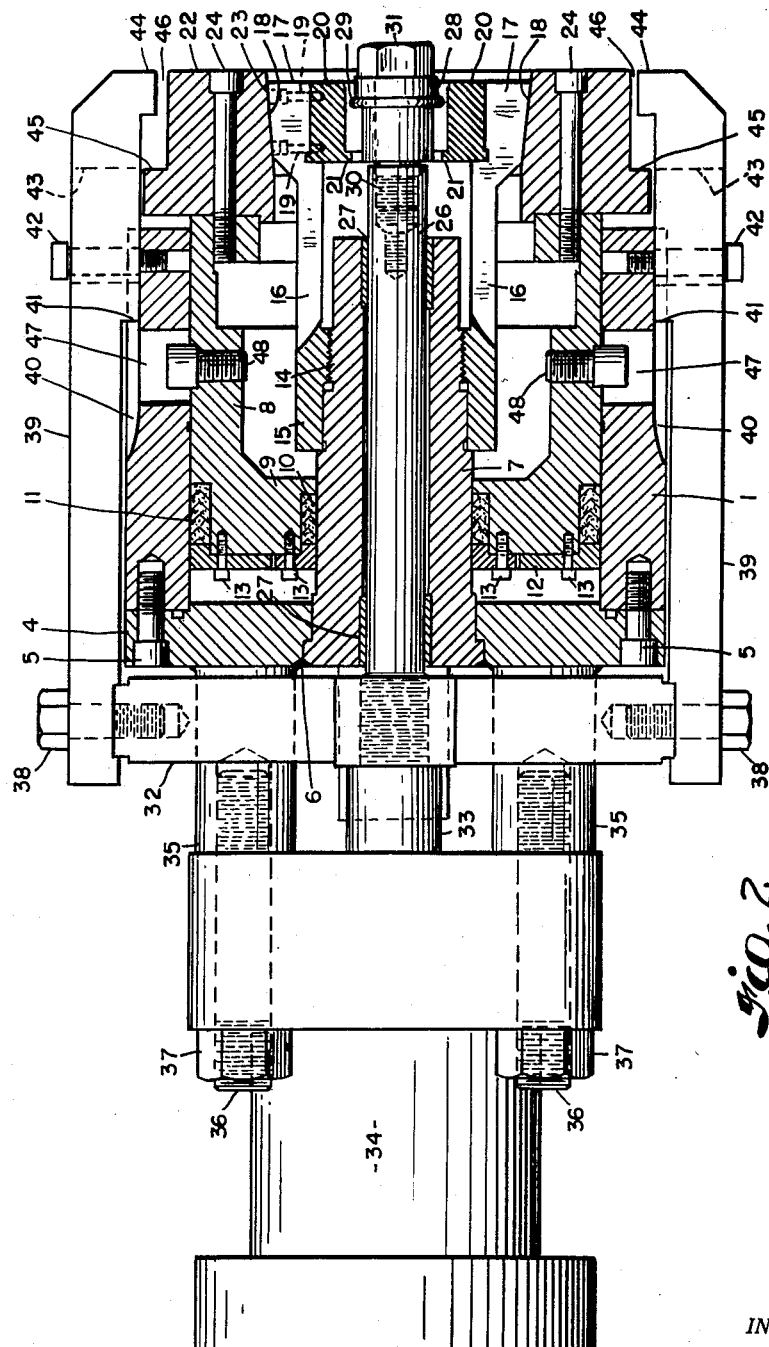
Fig. 2 is a section of such apparatus as viewed from the plane line of 2—2 in Fig. 1.

The main cylinder 1, as best shown in Fig. 2, is open at one end and provided at its other end with an annular backplate 4 secured thereto by means of screws 5. Rigidly secured in the central opening of such backplate, for example by the weld 6, is a tubular support member 7 which projects interiorly of the cylinder 1. A second hollow cylinder 8, open at one end and formed with a partially closed end 9, is slidably received within the main cylinder and on the tubular support 7. The end 9 of this second cylinder is disposed adjacent the backplate 4 to define therewith a space for the reception of hydraulic fluid under pressure in a manner and for a purpose to be described. Gaskets 10 and 11 located in recesses in the inner and outer extreme end portions of the cylinder end 9 are provided to form fluid seals between such end and the tubular support 7 and the main cylinder 1, respectively. A retaining ring 12 secured by screws 13 to the cylinder end 9 serves to maintain the gaskets in place.

Figure 3:
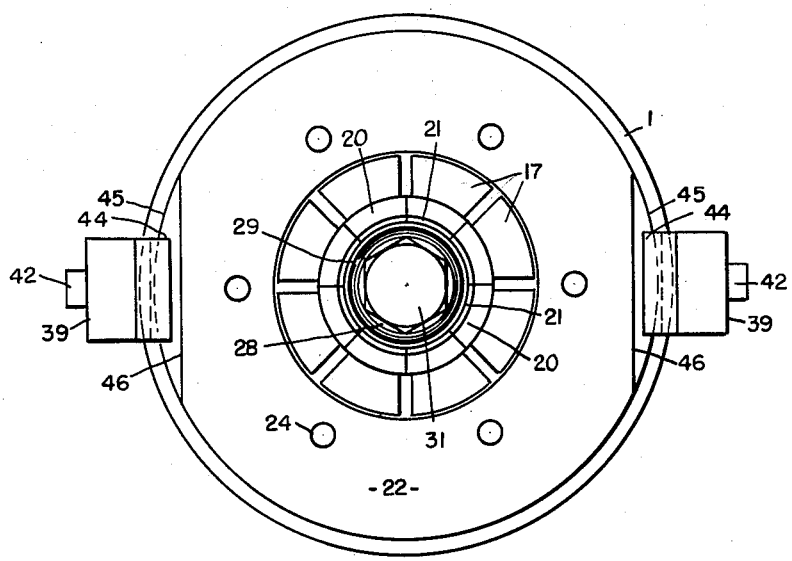
Fig. 3 is an end view of the apparatus less the support as viewed from the right in Fig. 1.

The tubular support 7 extends to a point adjacent the open end of the cylinder 1 and has a threaded reduced end portion 14 at its outer extremity adapted to removably support an outer sizing die structure. Such structure comprises a collar 15 which is threaded on the reduced end portion 14 and is formed with a plurality of circularly spaced apart fingers 16 projecting forwardly from the collar. Each finger 16 has at its free end an arcuate supporting segment 17, the outer surface 18 of which is inclined outwardly and forwardly, as shown, relative to the finger and hence the tubular support 7. Attached to each such segment by screws 19 extending therethrough from the outer surface is an outer die element 20 which is likewise of arcuate shape and, as shown most clearly in Fig. 3, the several die elements 20 engage each other to constitute a continuous circular outer sizing die. In order to accurately locate the die relative to the tube to be sized, the die elements 20 are provided with inturned flanges 21 at the respective inner ends thereof which form a seat for such tube.

Secured to the open end of the slidable inner cylinder 8 is a camming ring 22 having an inclined inside surface 23 adapted to engage the inclined surfaces 18 of the supporting segments 17. Screws 24 maintain this ring in position, and the inclination of surface 23 is such as to cam the segments radially inwardly upon forward movement of the ring. It will be appreciated that the inherent resiliency of the fingers 16 will permit them to be moved in this manner and will return them to normal position when the camming ring is withdrawn from its forward position. Since the ring is secured to the cylinder 8, axial reciprocation of this cylinder may be used to control the application of pressure to the outer sizing die, and as stated previously, the space between the backplate 4 of the main cylinder and the end 9 of the inner cylinder is adapted to receive hydraulic fluid. Such fluid may be supplied thereto under pressure by means of the conduit 25 to positively force the inner cylinder and the camming ring 22 to the forward operative position of these elements.

The apparatus further comprises an inner sizing die which is supported on a shaft 26 extending through the tubular support 7 and the bushings 27 located at each end thereof. This inner die has a cylindrical body 28 with a continuous flange or rib 29 extending radially outwardly therefrom and being rounded to provide a smooth outer surface. One end of the member 28 has a threaded stud 30 for engagement with a tapped recess in the forward end of shaft 26 while a bolt head 31 is provided at the other end to facilitate attachment and removal of the inner die. The shaft 26 extends rearwardly beyond the backplate 4 of the main cylinder 1 and is there threaded into a cross bar 32 which is disposed transversely of the apparatus. This cross bar in turn is connected to the piston rod 33 of a piston-cylinder assembly 34 supported by columns 35 mounted on the backplate. In the construction shown, the assembly support is achieved by means of studs 36 projecting from the columns and nuts 37 threaded thereon. Thus, the piston-cylinder assembly 34 is operative to reciprocate the inner sizing die.

Piston-cylinder assembly 34 is also operative to move the camming ring 22 rearwardly from its forward position thereby relating this camming action to the reciprocation of the inner sizing die. To this end, the cross bar 32 supports at its respective outer ends by means of the screws 38 the two arms 39 lying longitudinally adjacent the outer surface of the main cylinder 1. The cylinder is provided with grooves 40 to guide and support the shoulders 41 of such arms, and additional support is realized by the radially projecting cylinder cap screws 42 cooperable with slots 43 in the arms. Each arm has an inturned flange 44 at its free end adapted through engagement with the shoulder 45 formed by a respectively associated recess 46 in camming ring 22 to move the ring to the rear as the piston of the assembly 34 approaches the limit of its reverse motion. The inner cylinder 8 will, of course, also be moved to the rear, and the hydraulic system supplying fluid to the space between the two cylinders is such that the fluid may be expelled therefrom in this stage of the operation. Slots 47 in the outer or main cylinder 1 cooperate with the projecting cap screws 48 of the inner cylinder 8 to prevent the two cylinders from becoming disengaged.

The stroke of the piston-cylinder assembly 34 is adjusted so that the inner sizing die will occupy the position substantially as shown in Fig. 2, with the flange or rib 29 thereof located at a predetermined point intermediate the ends of the outer sizing die, at the limit of the forward piston movement. Reverse piston motion will move the inner sizing die and the arms 39 to the rear in unison, however, the design of the arms is such that they will engage the camming ring 22 only after the flange or rib 29 has been fully withdrawn from the outer sizing die.

The manner in which I employ this apparatus for the sizing of tube ends will now be described with particular reference to Figs. 4, 5, and 6. The tube to be sized is suitably supported in axial alignment with and adjacent the working end of the apparatus, and the piston-cylinder assembly 34 then actuated to move the inner sizing die to its forward position as shown in Fig. 4. When the inner sizing die has been thus positioned, the main cylinder 1 is moved forwardly on its supporting frame 2, for example by the hydraulic means 3, and on the tube until the tube is located within the outer sizing die in engagement with the seat formed by the flanges 21. This phase of the operation will, of course, locate the inner sizing die within the tube a predetermined distance from the end thereof. Hydraulic fluid under pressure is next supplied to the space between the main cylinder and the inner cylinder 8 to force the latter and hence the camming ring 22 to their forward position as illustrated in Fig. 5, thereby camming the supporting segments 17 radially inwardly. By virtue of the construction shown, this camming action uniformly applies compressive force in a radial direction to the entire peripheral surface of the outer sizing die, and the uniform application of force in this manner enables the apparatus to efficiently withstand the severe stresses encountered in use. The several elements 20 of the outer sizing die will be normally spaced slightly apart and will be moved into engagement to clamp and at the same time to compress the tube to substantially the desired outside diameter. Compression of the tube causes rib 29 to engage the inner surface thereof about what is substantially a line contact, and the full clamping pressure exerted by the outer sizing die embeds the rib firmly in such surface.

The piston-cylinder assembly 34 now operates to withdraw the inner sizing die from the tube, as shown in Fig. 6, while the tube is thus tightly clamped by the outer sizing die. In this stage of the operation, the flange 29 will displace material from the inner surface of the tube beyond the end thereof to form a thin tail or pipe flash which may be readily machined off without impairing the tube structure, the outer sizing die engagement with the tube preventing any expansion of the outside tube diameter by the inner die withdrawal. Arms 39 will move with the inner die and engage the camming ring 22 when such die reaches its full line position of Fig. 6 to release the outer sizing die from the tube. The apparatus may then be reciprocated to clear the tube and permit removal thereof. Owing to slight expansion of the tube after the sizing operation, the respective dies are designed to size the tube to dimensions accommodating such expansion.

The above described operating cycle of my apparatus is preferably automatically controlled by a suitable system actuating the several hydraulic means employed in the timed relation set forth. It is to be noted that the inner sizing die and the outer sizing die elements are removably attached to their respective supports and therefore die members of varying size may be readily used with the apparatus. Although I have shown and described a single sizing unit mounted upon the supporting frame, it will be apparent that two such units could be mounted in opposition thereon, whereby both ends of the tube may be sized simultaneously.

It will also be apparent in view of the foregoing that my improved apparatus is compact in construction and ideally suited for automatic, rapid cycle operation. With my invention, the extreme end portions of tubing may be efficiently sized without any working of the intermediate length thereof, thus permitting the tubing to be used substantially in its fabricated condition for shafts and like applications. Furthermore, the structural characteristics of the tubing will not be adversely affected by sizing in the manner disclosed. This disclosure has been detailed as required by statute, however, modifications in the construction and its mode of operation are possible without departing from the basic idea of the invention, such modifications readily suggesting themselves to those skilled in the art.

Other modes of applying the principle of the invention may be employed, change being made as regards the details described, provided the features stated in any of the following claims, or the equivalent of such be employed.

I therefore particularly point out and distinctly claim as my invention:

1. The method of sizing a tube which comprises the steps of bringing together an inner sizing tool and the tube to be sized to locate said tool freely within the tube a predetermined distance from an end thereof, compressing the tube portion intermediate the thus located tool and such tube end uniformly to an inner transverse dimension smaller than said tool by the application of external clamping pressure, and withdrawing said tool from the tube through such tube end while said pressure is being applied to thereby internally size the tube.

2. The method of sizing a tube which comprises the steps of bringing together an inner sizing tool and the tube to be sized to locate said tool freely within the tube a predetermined distance from an end thereof, compressing the tube uniformly on said tool by the external application of clamping pressure sufficient to embed such tool in the inner surface of the tube, and withdrawing said tool from the tube through such tube end while said pressure is being applied to thereby internally size the tube.

3. The method of sizing a tube end which comprises the steps of bringing together an inner sizing tool and the tube to be sized to locate said tool freely within the tube a predetermined distance from an end thereof, compressing the end portion of the tube uniformly over said predetermined distance and on said tool by the external application of clamping pressure sufficient to embed said tool in the inner surface of the tube, and withdrawing the tool from the tube through such tube end while said pressure is being applied to thereby internally size the tube.

4. The method of sizing a tube end which comprises the steps of bringing together an inner sizing tool and the tube to be sized to locate said tool freely within the tube a predetermined distance from an end thereof, compressing the end portion of the tube uniformly over said predetermined distance and on said tool by the application of clamping pressure normal thereto about the entire peripheral surface thereof, such compression embedding said tool in the inner surface of the tube, and withdrawing the tool from the tube through such tube end while said pressure is being applied to thereby internally size the tube.

5. The method of sizing a tube end which comprises the steps of advancing an inner sizing tool freely a predetermined distance within the tube end to be sized, compressing the end portion of the tube uniformly over said predetermined distance and on said tool by applying clamping pressure thereto, such compression embedding said tool in the inner surface of the tube, and retracting said tool from such tube end while said pressure is being applied to thereby internally size the tube end.

6. The method of sizing a cylindrical tube end which comprises the steps of advancing an inner sizing tool freely a predetermined distance within the tube end to be sized, compressing the end portion of the tube to desired outside diameter uniformly over said predetermined distance and on said tool by applying clamping pressure thereto in radial direction, such compression embedding said tool in the inner surface of the tube, and retracting said tool from such tube end while maintaining such pressure, whereby the inner and outer diameters of the tube end will be sized.

7. The method of sizing a cylindrical tube end which comprises the steps of advancing an inner sizing die to a position intermediate the ends of a surrounding outer sizing die, moving such die forwardly freely on the tube to be sized to locate an end portion thereof between the die, clamping such end portion with said outer sizing die uniformly to compress the same to desired outside diameter and to embed said inner sizing die in the inner surface of the tube, fully retracting such inner sizing die from such outer sizing die while the tube end portion is thus clamped to thereby internally size the same, disengaging said outer sizing die from the tube end portion, and withdrawing the die from the tube.

8. In apparatus for sizing a cylindrical tube end, a horizontally disposed hollow cylinder having an open end and a backplate closing the other end thereof, a second hollow cylinder likewise having an open end and a backplate closing the other end slidably received within said first-mentioned cylinder with the respective backplates thereof adjacent each other, an elongated tubular support secured to the backplate of said first mentioned cylinder and projecting interiorly thereof through the backplate of said second cylinder, an outer sizing die located at the extremity of said tubular support, such outer sizing die comprising a plurality of resilient fingers arranged in circular spaced apart relation and being provided with removable arcuately shaped die elements adapted when moved radially inwardly to form a continuous circular die of a diameter substantially equal to the desired outside tube diameter, each of said die elements having an inwardly directed flange at the inner end thereof to provide a seat for the end of the tube to be sized, a camming ring secured to the open end of said second cylinder operative upon forward movement thereof to bias said resilient fingers radially inwardly, a fluid pressure piston-cylinder assembly mounted on the backplate of said first mentioned cylinder, a shaft connected to such assembly extending through said tubular support, an inner sizing die of generally disc-like construction demountably attached to the free end of said shaft, said fluid pressure piston-cylinder assembly being operative to advance said inner sizing die to a forward position within and intermediate the ends of the outer sizing die and also to fully withdraw said inner sizing die from such outer sizing die, fluid pressure means operative to move said second cylinder forward relative to said first mentioned cylinder after said inner sizing die has been advanced to such forward position to thereby compress the tube to be sized to desired outside diameter and embed said inner sizing die in the inner surface of such tube, and means connected to said piston-cylinder assembly operative to engage said camming ring after said inner sizing die has been fully withdrawn to move the same from closed position and thereby release the outer sizing die from the tube.

9. In apparatus for sizing a cylindrical tube end, an outer sizing die comprising a plurality of arcuately-shaped die elements circumferentially arranged in spaced apart relation, an inwardly directed flange at the inner end of each such die element adapted to form a seat for the end of the tube to be sized, resilient support means associated with said die elements adapted to move in a radial direction, a camming ring engaging the outer surfaces of said support means operative when moved to a closed position to bias such support means inwardly whereby said die elements will move radially to form a continuous circular die of a diameter substantially equal to the desired outside tube diameter, a demountable inner sizing die of generally disc-like construction adapted to be disposed within said outer sizing die intermediate the ends thereof, means operative to move such die in unison forwardly on the tube to be sized with the tube end engaging the seat formed within the outer sizing die and the inner sizing die located within the tube, fluid pressure means operative to actuate said camming ring to such closed position to thereby clamp and compress the tube to desired outside diameter, such compression serving to embed said inner sizing die in the inner surface of the tube, a piston-cylinder assembly adapted to withdraw said inner sizing die while the tube is so clamped thereby internally sizing the tube, and release mechanism operatively connected with said piston-cylinder assembly to engage said camming ring after said inner sizing die has been fully withdrawn and displace the same from closed position thereby releasing the outer sizing die from the tube.

10. In apparatus for sizing a cylindrical tube end, an outer sizing die comprising a plurality of arcuately-shaped die elements circumferentially arranged in spaced apart relation each to the other, an inwardly directed flange at the inner end of each such die element adapted to form a seat for the end of the tube to be sized, resilient support means associated with said die elements adapted to move in a radial direction, a camming ring engaging the outer surfaces of said support means operative when moved to a closed position to bias such support means inwardly whereby said die elements will move radially to form a continuous circular die of a diameter substantially equal to the desired outside tube diameter, a demountable inner sizing die of generally disc-like construction adapted to be disposed within said outer sizing die intermediate the ends thereof, fluid pressure means operative to actuate said camming ring to such closed position to thereby clamp and compress the tube to desired outside diameter, such compression serving to embed said inner sizing die in the inner surface of the tube, a piston-cylinder assembly adapted to withdraw said inner sizing die while the tube is so clamped thereby internally sizing the tube, and release mechanism operatively connected with said piston-cylinder assembly to engage said camming ring after said inner sizing tool has been fully withdrawn and displace the same from closed position thereby releasing the outer sizing die from the tube.

11. In apparatus for sizing a cylindrical tube end, an outer sizing die comprising a plurality of arcuately-shaped die elements circumferentially arranged in spaced apart relation each to the other, resilient support means associated with said die elements adapted to move in a radial direction, a camming ring engaging said support means operative when moved to a closed position to bias such support means inwardly whereby said die elements will move radially to form a continuous circular die of a diameter substantially equal to the desired outside tube diameter, a demountable inner sizing die of generally disc-like construction adapted to be disposed within said outer sizing die intermediate the ends thereof, fluid pressure means operative to actuate said camming ring to such closed position to thereby clamp and compress the tube to desired outside diameter, such compression serving to embed said inner sizing die in the inner surface of the tube, a piston-cylinder assembly adapted to withdraw said inner sizing die while the tube is so clamped thereby internally sizing the tube, and means operatively connected to said piston-cylinder assembly to engage said camming ring after said inner sizing die has been fully withdrawn and move the same from closed position thereby releasing the outer sizing die from the tube.

12. In apparatus for sizing a cylindrical tube end, an outer sizing die comprising a plurality of arcuately-shaped die elements circumferentially arranged in spaced apart relation each to the other, resilient support means associated with said die elements adapted to move in a radial direction, a camming ring engaging said support means operative when moved to a closed position to bias such support means inwardly whereby said die elements will move radially to form a continuous circular die of a diameter substantially equal to the desired outside tube diameter, a demountable inner sizing die of generally disc-like construction adapted to be disposed within said outer sizing die intermediate the ends thereof, means operative to actuate said camming ring to such closed position to thereby clamp and compress the tube to desired outside diameter, such compression serving to embed said inner sizing die in the inner surface of the tube, fluid pressure means adapted to withdraw said inner sizing die while the tube is so clamped thereby internally sizing the tube, and means operated by said fluid pressure means to engage said camming ring after said inner sizing die has been fully withdrawn and move the same from closed position thereby releasing the outer sizing die from the tube.

13. In apparatus for sizing a tube end, an outer sizing die comprising a plurality of spaced die elements, resilient support means associated with said die elements, cam means engaging said support means operative to move said die elements together to form the outer sizing die, an inner sizing die adapted to be disposed within said outer sizing die intermediate the ends thereof, means operative to actuate said cam means after said inner sizing die has been thus positioned to cause said die elements to clamp and compress the tube to be sized, such compression serving to embed said inner sizing die in the inner surface of the tube, fluid pressure means adapted to withdraw said inner sizing die while the tube is so clamped thereby internally sizing the tube, and means operative in response to retraction of said inner sizing die to move said cam means to release the outer sizing die from the tube after said inner sizing die has been fully withdrawn.

14. Tube sizing apparatus comprising an inner sizing die, means operative to move such die to a position within the tube to be sized, external clamping means operative after said die is so positioned to engage the tube and compress the same on said die, means operative to withdraw such die from the thus clamped tube, thereby internally sizing the same, and means operative in response to complete withdrawal of the die to disengage said clamping means from the tube.

15. Tube end sizing apparatus comprising radially movable outer die means, an inner sizing die adapted to be positioned within said outer sizing die means intermediate the operative ends of the latter, cam means operative to move said outer die means radially inwardly after said inner sizing die has been thus positioned to compress the tube to be sized and embed said inner sizing die in the inner surface thereof, means operative to withdraw said inner sizing die from said outer sizing die means while the tube is so compressed, and means operative in response to complete withdrawal of said inner sizing die to move said cam means to release said outer sizing die means from the tube.

16. In apparatus for sizing a cylindrical tube end, an outer sizing die comprising a plurality of arcuately-shaped die elements circumferentially arranged in spaced apart relation each to the other, support means for said die elements adapted to move in a radial direction, cam means operative when moved to one position to bias said support means inwardly whereby said die elements will move radially to form a continuous circular die of a diameter substantially equal to the desired outside tube diameter, an inner sizing die adapted to be positioned within said outer sizing die intermediate the operative ends thereof, means operative to actuate said cam means to such one position after said inner sizing die has been thus located relative to the outer sizing die to compress the tube to desired outside diameter and embed said inner sizing die in the inner surface of the same, means operative to withdraw said inner sizing die while the tube is so clamped thereby internally to size the tube, and means responsive to complete withdrawal of said inner sizing die to move said cam means from such one position to release the outer sizing die from the tube.

References Cited in the file of this patent

UNITED STATES PATENTS

| | | |
|---|---|---|
| 758,195 | Schweinert | Apr. 26, 1904 |
| 1,301,935 | Gulick | Apr. 29, 1919 |
| 1,962,944 | Spatten | June 12, 1934 |
| 2,060,860 | Flynt | Nov. 17, 1936 |
| 2,211,622 | Hunziker | Aug. 13, 1940 |
| 2,275,451 | Maxwell | Mar. 10, 1942 |
| 2,307,432 | Tuttle | Jan. 5, 1943 |
| 2,480,762 | Parker | Aug. 30, 1949 |
| 2,535,339 | Woeller | Dec. 26, 1950 |

FOREIGN PATENTS

| | | |
|---|---|---|
| 525,855 | France | June 16, 1921 |